US012605790B2

(12) United States Patent
Braun et al.

(10) Patent No.: US 12,605,790 B2
(45) Date of Patent: Apr. 21, 2026

(54) WELDING METHODS FOR MAKING DIE CAST MOULD PART AND ACTUATOR HOUSING

(71) Applicants: Vitesco Technologies GmbH, Regensburg (DE); Continental Autonomous Mobility Germany GmbH, Ingolstadt (DE)

(72) Inventors: Christian Braun, Nuremberg (DE); Hajo Gugel, Munich (DE); Johannes Seeger, Nuremberg (DE)

(73) Assignees: Schaeffler Technologies AG & Co. KG, Herzogenaurach (DE); Continental Autonomous Mobility Germany GmbH, Ingolstadt (DE)

( * ) Notice: Subject to any disclaimer, the term of this patent is extended or adjusted under 35 U.S.C. 154(b) by 676 days.

(21) Appl. No.: 18/017,960

(22) PCT Filed: Aug. 10, 2021

(86) PCT No.: PCT/EP2021/072255
§ 371 (c)(1),
(2) Date: Jan. 25, 2023

(87) PCT Pub. No.: WO2022/034064
PCT Pub. Date: Feb. 17, 2022

(65) Prior Publication Data
US 2023/0249287 A1 Aug. 10, 2023

(30) Foreign Application Priority Data
Aug. 11, 2020 (DE) ..................... 10 2020 210 182.5

(51) Int. Cl.
B23K 26/21 (2014.01)
B23K 103/10 (2006.01)
C22C 21/08 (2006.01)

(52) U.S. Cl.
CPC .............. B23K 26/21 (2015.10); C22C 21/08 (2013.01); *B23K 2103/10* (2018.08)

(58) Field of Classification Search
CPC . C22C 21/06; C22C 21/08; B23K 26/21–323; B23K 2103/10
See application file for complete search history.

(56) References Cited

U.S. PATENT DOCUMENTS 4,874,578 A * 10/1989 Homberger ............. C22C 21/06
148/552
6,955,785 B2 * 10/2005 Saga ........................ C22C 21/06
420/533
(Continued)

FOREIGN PATENT DOCUMENTS

CN 108723589 A 11/2018
CN 110216375 A 9/2019
(Continued)

OTHER PUBLICATIONS

Rheinfelden. CASTADUCTÂ® -42 (Year: 2017).*
(Continued)

*Primary Examiner* — Topaz L. Elliott
(74) *Attorney, Agent, or Firm* — Wood Herron & Evans LLP

(57) ABSTRACT

A welding method includes welding a die cast mould part made of an Al—Mg—Fe alloy in a fluid-tight manner to at least one other metal part. A Mg content of $4\% \leq Mg \leq 4.6\%$ and an Fe content of $1.31\% \leq Fe \leq 1.7\%$ are used for the aluminum alloy, as well as an admixture content of additional alloying constituents comprising a maximum of 0.2% Si. A blue diode laser is used for welding. No filler metal is used. The welding method may be used to construct an actuator housing.

5 Claims, 1 Drawing Sheet

Two-substance diagram of the die casting alloy Castaduct-42, AlMg4Fe2 at 4.5% Mg

(56)  References Cited

U.S. PATENT DOCUMENTS

| | | | | |
|---|---|---|---|---|
| 8,890,022 | B2 * | 11/2014 | Beck | B23K 26/24 |
| | | | | 219/121.64 |
| 11,524,362 | B2 * | 12/2022 | Masse | C22F 1/043 |
| 2004/0091387 | A1 * | 5/2004 | Saga | B23K 26/32 |
| | | | | 420/533 |
| 2011/0097598 | A1 * | 4/2011 | McNutt | B23K 26/0626 |
| | | | | 428/650 |
| 2012/0298638 | A1 * | 11/2012 | Beck | B23K 26/26 |
| | | | | 219/121.64 |
| 2017/0341144 | A1 | 11/2017 | Pelaprat et al. | |
| 2017/0341180 | A1 * | 11/2017 | Zediker | B22F 12/90 |
| 2019/0061055 | A1 | 2/2019 | Yang et al. | |
| 2020/0101563 | A1 * | 4/2020 | Tao | B23K 26/22 |
| 2020/0114468 | A1 * | 4/2020 | Masse | B23K 26/32 |
| 2020/0171603 | A1 * | 6/2020 | Yang | B23K 26/244 |
| 2020/0206844 | A1 | 7/2020 | Zediker et al. | |
| 2021/0404353 | A1 * | 12/2021 | Li | B23K 26/0093 |

FOREIGN PATENT DOCUMENTS

| | | | |
|---|---|---|---|
| CN | 110238517 A | 9/2019 | |
| DE | 112017007174 T5 | 11/2019 | |
| DE | 112017007470 T5 | 1/2020 | |
| DE | 102019006217 A1 | 3/2020 | |
| JP | H0866783 A | 3/1996 | |
| JP | 2009127075 A | 6/2009 | |
| WO | WO-2021138510 A1 * | 7/2021 | B23K 26/21 |

OTHER PUBLICATIONS

Wikipedia: Aluminum Alloy (Year: 2025).*
German Patent Office, Examination Report in DE 10 2020 210 182.5, dated Aug. 3, 2021 (4 pages).
International Searching Authority, International Report on Patentability issued in PCT/EP2021/072255, dated Oct. 31, 2022 (13 pages).
International Searching Authority, International Search Report on issued in PCT/EP2021/072255, dated Dec. 12, 2021 (14 pages).
Morinaga, Takuichi, et. al., "Influence of Iron on Die-Casting Alloys of he Al-Si-Cu System," Transactions of the Japan Institute of Metals, Bd. 6, Nr. 2, Jan. 1, 1965, pp. 72-77, XP055868887, ISSN: 0021-4434, https://www.stage.jst.go.jp/article/matertrans1960/6/2/6_2_72 (6 pages).
Nuburu Inc., "The First Industrial Blue Laser is changing the game," Dec. 31, 2019, XP055869011, https://www.mtb.es/files/products/NUBURU_White_Paper_Blue_Laser_April_2019_1.pdf (9 pages).
Rheinfelden Alloys, Primary aluminum HPDC Alloys for Structural Casts in Vehicle Construction, Aug. 31, 2018, pp. 1-60, XP055792919, https://rheinfelden-alloys.eu/wp/content/uploads/2018/09/rheinfelden_alloys_structural_casts_2018.pdf (60 pages).
Chinese Patent Office, Office Action issued in CN 202180055969.7, dated Jan. 28, 2026 (8 pages) with English summary.

* cited by examiner

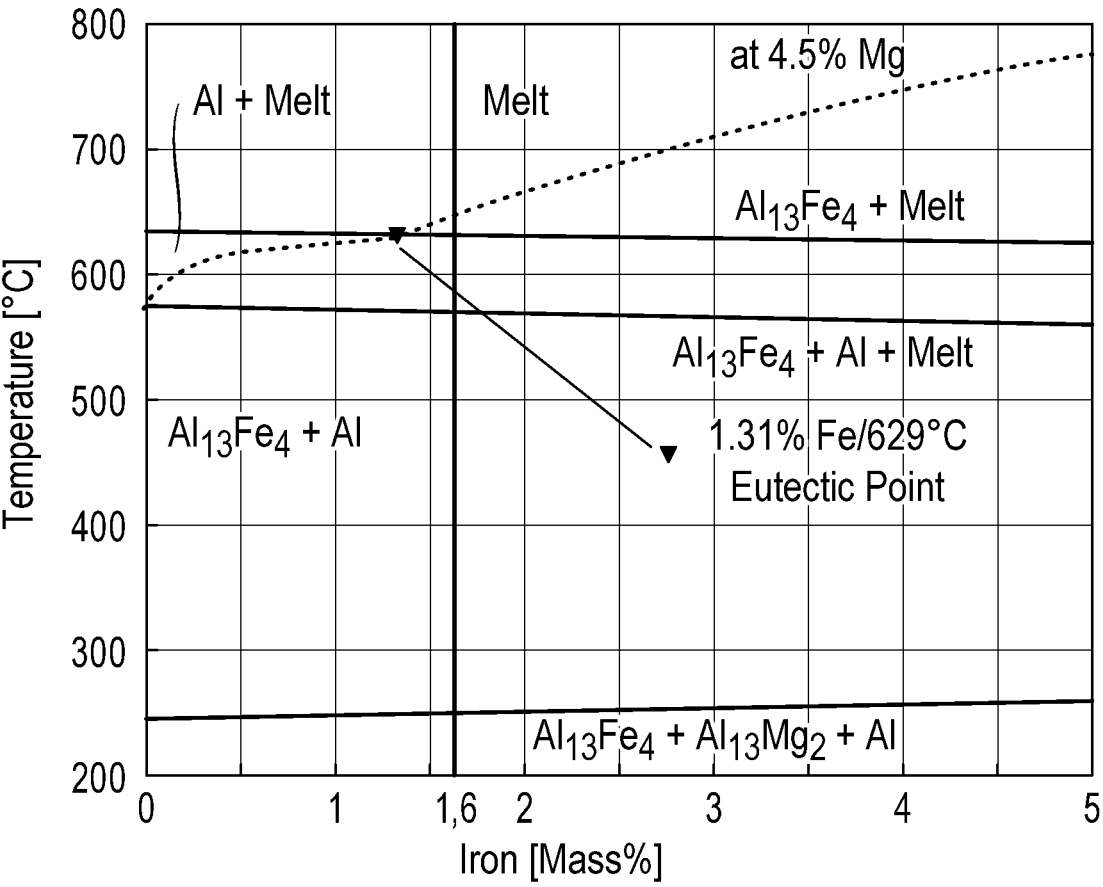
Two-substance diagram of the die casting alloy Castaduct-42, AlMg4Fe2 at 4.5% Mg

WELDING METHODS FOR MAKING DIE CAST MOULD PART AND ACTUATOR HOUSING

CROSS-REFERENCE TO RELATED APPLICATIONS

This application is a national phase entry of, and claims priority to, International Application No. PCT/EP2021/072255, filed Aug. 10, 2021, which claims priority to German Application No. DE 10 2020 210 182.5 filed Aug. 11, 2020.

TECHNICAL FIELD

This application relates to a welding method, a die cast mould part, an actuator housing, and various uses of such a die cast mould part.

BACKGROUND

Aluminum die casting is known to be problematic in welding because it cannot be welded hydraulically tight with other metals. An aluminum die casting forms a coarse-pored weld structure during welding, so that a hydraulically tight welded joint cannot be achieved (so-called weld porosity).

Thus, it would be desirable to improve the weldability of aluminum die castings.

SUMMARY

To address these and other problems with conventional devices and methods, a welding method is proposed, in accordance with a first set of embodiments, and in which a die cast mould part made of an Al—Mg—Fe alloy is welded in a fluid-tight manner to at least one other metal part.

The aluminum alloy comprises a Mg content of $4\% \leq Mg \leq 4.6\%$ and an Fe content of $1.31\% \leq Fe \leq 1.7\%$, as well as an admixture content of additional, minor alloying constituents, which as such comprises a maximum of 0.2% Si. The Fe content comprises the Al—Mg—Fe eutectic and a hypereutectic composition of the two alloying elements Fe and Mg.

These contents in % are to be understood as mass % contents.

A blue diode laser and no welding filler material is used for the welding.

An Al—Mg—Fe alloy of the proposed type is characterized by its outstanding mould filling capacity and excellent castability. In combination with the proposed blue diode laser, it also enables fluidically tight weld connectivity with another metal, the weld connectivity being favored by the very low silicon content of max. 0.2%.

This opens up new application possibilities for such an Al—Mg—Fe alloy, for example with regard to complex housings of water or oil pumps, where up to now jointing techniques have been used to achieve hydraulic tightness, involving the use of gaskets, screw connections and/or bonding, etc.

The proposed welding method thus contributes to cost and weight reduction of die cast mould parts.

Other applications for such an Al—Mg—Fe alloy include engine control unit housings, radar sensors and more of the like.

Good welding results are achieved in a blue wavelength range of 450 nm±30 nm and in particular at a wavelength of 450 nm or about 450 nm.

In this context, the short wavelengths of the blue laser (about 405 nm to about 490 nm) favor higher absorption of energy by the proposed Al—Mg—Fe alloy, so that higher quality and more uniform welding results are obtained during laser processing.

For example, a (pure) aluminum material of grade Al 99.5 has a higher absorption capacity by a factor of 2 when using such a blue diode laser with a wavelength of approx. 450 nm—compared to a laser with a wavelength of approx. 1064 nm (infrared radiation).

An Al—Mg—Fe alloy of the proposed type, on the other hand, has even a factor of 2.5 higher absorptivity when using such a blue diode laser with a wavelength of about 450 nm—opposite a laser with a wavelength of about 1064 nm (infrared radiation).

In the proposed welding method, the other metal part that can be, for example, a die cast mould part of the same or the proposed type, an aluminum part or pure aluminum part (made of, for example, 99.5 Al), a wrought aluminum alloy part (made of, for example, a 5000 or 6000 series wrought aluminum alloy, such as AlMgSi1, AlMg3Mn, AlMg4,6Mn) and/or a copper material part. Until now, it has not been possible to weld such metal parts hydraulically tight to an aluminum die cast mould part.

Furthermore, a die cast mould part is proposed which is welded to at least one further metal part, the welded joint being produced by a welding method of the type described above. The die cast mould part may be in the form of a housing component.

In a second set of embodiments, an actuator housing having at least one such die cast mould part is proposed.

At this point, reference is made once again to the new applications of the proposed Al—Mg—Fe alloy already mentioned above.

In another set of embodiments, a use of a die cast mould part of the type previously described or an actuator housing of the type previously described in a vehicle is proposed.

A vehicle is to be understood as any type of vehicle that is operated either by an internal combustion engine and/or an electric motor, but in particular passenger cars and/or commercial vehicles. This can include partially autonomous and, in particular, fully autonomous vehicles.

Use of a die cast mould part of the type described above for a control unit, in particular of a vehicle, is further proposed.

Use of a die cast mould part of the type described above for an actuator housing, in particular of a vehicle, is further proposed.

Furthermore, a use of a blue diode laser for fluid-tight welding of a die cast mould part made of an Al—Mg—Fe alloy with at least one further metal part is proposed.

Thereby, a Mg content of $4\% \leq Mg \leq 4.6\%$ and an Fe content of $1.31\% \leq Fe \leq 1.7\%$ are used for the aluminum alloy, as well as an admixture content of additional, minor alloying constituents, which comprises a maximum of 0.2% Si, whereby no welding filler material is used.

With regard to the blue wavelength range used, the above applies in an analogous manner.

The findings underlying this disclosure are based on tests with an Al—Mg—Fe alloy used called Castaduct®-42 [AlMg4Fe2], commercially available from RHEINFELDEN ALLOYS GmbH & Co. KG. With regard to the properties of Castaduct®-42 [AlMg4Fe2], reference is made at this point to the manual entitled "Aluminum die casting alloys for structural casting in vehicle construction RHEINFELDEN ALLOYS" ("Hüttenaluminium-Druckgusslegierungen für Strukturguss im Fahrzeugbau RHEINFELDEN ALLOYS") and specifically to page 28, where all the properties of Castaduct® are described.

BRIEF DESCRIPTION OF THE DRAWINGS

The accompanying drawing, which is incorporated in and constitutes a part of this specification, illustrates one or more embodiments of the invention and, together with the general description given above and the detailed description given below, explains the one or more embodiments of the invention.

The FIGURE illustrates the proposed Al—Mg—Fe alloy, specifically with a two-substance diagram for Castaduct®-42, AlMg4Fe2 at 4.5% Mg, which is also contained in the above-referenced manual—on page 29.

DETAILED DESCRIPTION

This two-dimensional graphic in the FIGURE represents a vertical section through a so-called three-dimensional three-substance diagram—also known as a ternary phase or state diagram—which graphically depicts the composition of the die casting alloy Castaduct®-42 with regard to its essential alloying constituents: aluminum (Al; main constituent), magnesium (Mg) and iron (Fe) as well as individual phases of this die casting alloy.

The section in question is at a Mg content of 4.5%. The area claimed with respect to the Fe content comprises the Al—Mg—Fe eutectic as well as a hypereutectic composition of the two alloying components Fe and Mg (in the FIGURE, the area for the Fe content of $1.31\% \leq Fe \leq 1.7\%$, i.e., the ascending area to the right of the eutectic point).

This die casting alloy comprises an admixture content of additional alloying elements as shown below (see also the above-referenced manual on page 28).

TABLE 1

Chemical composition of Castaduct ®-42,
AlMg4Fe2 in the ingot (in mass %).

| [%] | Si | Fe | Cu | Mn | Mg | Zn | Ti | other |
|------|-----|-----|-----|------|-----|-----|-----|-------|
| min. | | 1.5 | | | 4.0 | | | |
| max. | 0.2 | 1.7 | 0.2 | 0.15 | 4.6 | 0.3 | 0.2 | Be |

These individual components or additional elements Si, Cu, Mn, Zn, Ti and others (cf. Table 1) of said admixture content can be understood among each other in the context of this disclosure in the sense of a and/or linkage.

The mentioned experiments are also based on a blue diode laser commercially available from Laserline GmbH (so called LDMblue™ series) with a power of up to 2 kW cw (cw=continuous wave).

Optical specifications

| Max. output power | 500 W | 1.000 W¹ | 1.000 W | 1.500 W¹ |
|---|---|---|---|---|
| Beam quality | 60 mm mrad | 60 mm mrad | 100 mm mrad | 100 mm mrad |
| Light guide cable | 600 µm [NA 0.2] | 600 µm [NA 0.2] | 1.000 µm [NA 0.2] | 1.000 µm [NA 0.2] |
| Min. focus at f = 100 mm | 600 µm | 600 µm | 1.000 µm | 1.000 µm |

4

-continued

Optical specifications

| Max. output power | 500 W | 1.000 W¹ | 1.000 W | 1.500 W¹ |
|---|---|---|---|---|
| Fiber plug | | LLK-D/Auto | | |
| Fiber length | 5 m, 10 m | 5 m | 5 m | 5 m |
| Power stability | | <+/−2% over 2 hours | | |
| Wavelength range | | 400 nm to 500 nm | | |

Mechanical specifications

| VG5H² | weight approx. 50 kg, dimensions: 19-inch rack, 5 HE (220 mm), 636 mm deep |
|---|---|
| VG7H | weight approx. 110 kg, dimensions: 19-inch rack, 7U (312 mm), 672 mm deep |

Connection data

| Power supply | 400-480 V, 3 phases, PE, 50 or 60 Hz | | | |
|---|---|---|---|---|
| Connected load | 4.0 kW | 6.7 kW | 5.4 kW | 9.6 kW |
| Recommended cooling capacity | 3.5 kW | 5.7 kW | 4.4 kW | 8.1 kW |
| Hardware interfaces | Digital 24 V, analog power setting 0-10 V, safety interfaces | | | |

Ambient conditions

| Temperature | 10-45° C. in operation, otherwise 5-65° C. |
|---|---|
| Humidity | maximum 70% @ 25° C., non-condensing |
| Protection class | IP54 |
| Protection class | Laser protection class 1 according to DIN EN 60825-1 |

Options

| Interfaces | Profibus DP, Ethernet, RS232 (VG5H) |
|---|---|
| Optics | Special Laserline optics for 450 nm Anwendungen |
| other | Teleservice, pilot laser, CMOS-camera, software for PC |

Table 2: Specification of the LDMblue™ Laser Series (Excerpt from a Laserline GmbH Manual)

Compared to a fiber laser or disk laser, the welding energy of such a diode laser can advantageously be introduced almost rectangularly, i.e., more uniformly, into the weld over the entire width of its laser beam profile. Such an avoidance of energy peaks thereby favors the energy input.

The resulting welded joint is not only fluidically tight, but also meets electromagnetic compatibility (EMC) requirements.

The embodiments described above are only descriptions of preferred embodiments of the present invention and are not intended to limit the scope of the present invention. Various variations and modifications can be made to the technical solution of the present invention by those of ordinary skill in the art, without departing from the design of the present invention. The variations and modifications should all fall within the claimed scope defined by the claims of the present invention.

What is claimed is:

1. A welding method, comprising:

welding a die cast mould part made of an Al—Mg—Fe alloy in a fluid-tight manner to at least one other metal part, wherein for the Al—Mg—Fe alloy a Mg content of $4\% \leq Mg \leq 4.6\%$ and an Fe content of $1.31\% \leq Fe \leq 1.7\%$ are used, wherein the Fe content comprises an Al—Mg—Fe eutectic and a hypereutectic composition of alloy constituents Fe and Mg, as well as an admixture content of additional alloy constituents, which comprises a maximum of 0.2% Si, and wherein a blue diode laser and no welding filler material is used for welding.

2. The welding method of claim 1, wherein a wavelength of the blue diode laser is in a range of 450 nm±30 nm in the welding step.

3. The welding method of claim 2, wherein the wavelength of the blue diode laser is 450 nm in the welding step.

4. The welding method of claim 1, wherein the at least one other metal part includes at least one of: an Al—Fe die cast mould part, a pure aluminum part, a wrought aluminum alloy part, and a copper material part.

5. The welding method of claim 3, wherein the at least one other metal part includes at least one of: an Al—Fe die cast mould part, a pure aluminum part, a wrought aluminum alloy part, and a copper material part.

\*  \*  \*  \*  \*